US006839229B2

United States Patent
Kyozuka et al.

(10) Patent No.: US 6,839,229 B2
(45) Date of Patent: Jan. 4, 2005

(54) INFORMATION PROCESSING DEVICE AND EXTERNAL UNIT

(75) Inventors: Masahiko Kyozuka, Kawasaki (JP); Eiji Doi, Kawasaki (JP); Daisuke Yamagishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/102,754

(22) Filed: Mar. 22, 2002

(65) Prior Publication Data

US 2003/0048605 A1 Mar. 13, 2003

(30) Foreign Application Priority Data

Sep. 7, 2001  (JP) ........................................ 2001-271828

(51) Int. Cl.[7] .............................................. G06F 1/16
(52) U.S. Cl. ...................................... 361/686; 361/683
(58) Field of Search .......................... 361/679, 683–686, 361/724, 681

(56) References Cited

U.S. PATENT DOCUMENTS 5,155,659 A * 10/1992 Kunert ........................ 361/380
5,617,297 A * 4/1997 Lo et al. ...................... 361/737
6,442,637 B1 * 8/2002 Hawkins et al. ............ 710/300
6,447,306 B1 * 9/2002 Paredes et al. ............. 439/76.1

FOREIGN PATENT DOCUMENTS

JP          06-089131          3/1994

* cited by examiner

Primary Examiner—Yean-Hsi Chang
(74) Attorney, Agent, or Firm—Staas & Halsey LLP

(57) ABSTRACT

Disclosed herein is an information processing device including a body having a first surface and a second surface, the first surface being provided with a display unit, the second surface being formed with an opening; and an external unit detachably mounted on the second surface of the body so as to cover the opening. The external unit includes a card incorporating an electronic circuit, a case accommodating the card, and a connector for electrically connecting the electronic circuit of the card to an electronic circuit provided in the body. With this configuration, the versatility of this device can be improved and possible damage to any portion of the device can be prevented. This configuration is suitable for a notebook personal computer or the like.

8 Claims, 15 Drawing Sheets

FIG.15

| | 16-bit PC Card interface | | CFSLOT | | | 16-bit PC Card interface | | CFSLOT | |
|---|---|---|---|---|---|---|---|---|---|
| | Memory-Only | I/O and Memory | | | | Memory-Only | I/O and Memory | | |
| 1 | GND | GND | GND | 1 | 35 | GND | GND | - | |
| 2 | D3 | D3 | D3 | 2 | 36 | CD1# | CD1# | CD1# | 26 |
| 3 | D4 | D4 | D4 | 3 | 37 | D11 | D11 | D11 | 27 |
| 4 | D5 | D5 | D5 | 4 | 38 | D12 | D12 | D12 | 28 |
| 5 | D6 | D6 | D6 | 5 | 39 | D13 | D13 | D13 | 29 |
| 6 | D7 | D7 | D7 | 6 | 40 | D14 | D14 | D14 | 30 |
| 7 | CE1# | CE1# | CE1# | 7 | 41 | D15 | D15 | D15 | 31 |
| 8 | A10 | A10 | A10 | 8 | 42 | CE2# | CE2# | CE2# | 32 |
| 9 | OE# | OE# | OE# | 9 | 43 | VS1# | VS1# | VS1# | 33 |
| 10 | A11 | A11 | - | - | 44 | RUF | IORD# | IORD# | 34 |
| 11 | A9 | A9 | A9 | 10 | 45 | RFU | IOWR# | IOWR# | 35 |
| 12 | A8 | A8 | A8 | 11 | 46 | A17 | A17 | - | |
| 13 | A13 | A13 | - | | 47 | A18 | A18 | - | |
| 14 | A14 | A14 | - | | 48 | A19 | A19 | - | |
| 15 | WE# | WE# | WE# | 36 | 49 | A20 | A20 | - | |
| 16 | READY | IREQ# | BSY# | 37 | 50 | A21 | A21 | - | |
| 17 | Vcc | Vcc | Vcc | 13 | 51 | Vcc | Vcc | Vcc | 38 |
| 18 | Vpp1 | Vpp1 | - | | 52 | Vpp2 | Vpp2 | N.C- | 39 |
| 19 | A16 | A16 | - | | 53 | A22 | A22 | - | |
| 20 | A15 | A15 | - | | 54 | A23 | A23 | - | |
| 21 | A12 | A12 | - | | 55 | A24 | A24 | - | |
| 22 | A7 | A7 | A7 | 12 | 56 | A25 | A25 | - | |
| 23 | A6 | A6 | A6 | 14 | 57 | VS2# | VS2# | VS2# | 40 |
| 24 | A5 | A5 | A5 | 15 | 58 | RESET | RESET | ESET | 41 |
| 25 | A4 | A4 | A4 | 16 | 59 | WAIT# | WAIT# | WAIT# | 42 |
| 26 | A3 | A3 | A3 | 17 | 60 | RFU | INPACK# | INPACK# | 43 |
| 27 | A2 | A2 | A2 | 18 | 61 | REG# | REG# | REG# | 44 |
| 28 | A1 | A1 | A1 | 19 | 62 | BVD2 | SPKR# | SPKR# | 45 |
| 29 | A0 | A0 | A0 | 20 | 63 | BVD1 | STSCHG# | STSCHG# | 46 |
| 30 | D0 | D0 | D0 | 21 | 64 | D8 | D8 | D8 | 47 |
| 31 | D1 | D1 | D1 | 22 | 65 | D9 | D9 | D9 | 48 |
| 32 | D2 | D2 | D2 | 23 | 66 | D10 | D10 | D10 | 49 |
| 33 | WP | IOIS16# | WP | 24 | 67 | CD2# | CD2# | CD2# | 25 |
| 34 | GND | GND | - | | 68 | GND | GND | GND | 50 |

INFORMATION PROCESSING DEVICE AND EXTERNAL UNIT

BACKGROUND OF THE INVENTION

1. Field of the Invention

The present invention relates to an information processing device and an external unit applicable to the information processing device.

2. Description of the Related Art

In recent years, an information processing device having a display unit serving also as inputting means is known as a portable information processing device. For example, in an information processing device allowing an operator to input with a stylus, a transparent touch panel is provided on the upper surface of the display unit. By making the tip of the stylus into contact with the touch panel, information is input or inputting with a keyboard additionally used is associated.

In this kind of information processing device, expandability is generally considered. In a notebook personal computer, for example, a slot is formed on a side surface of its housing. By inserting a PC card into this slot, a memory capacity can be increased or the connection with a network can be facilitated.

The term of PC card is a general term for credit-card sized peripheral equipment conforming to the "PC Card Standard" planned by a joint effort between PCMCIA (Personal Computer Memory Card International Association) and JEIDA (Japan Electronic Industry Development Association).

Some kind of desktop personal computer also supports a PC card.

There are several types of PC cards such as SRAM, flash memory, hard disk, modem, SCSI, and LAN cards.

The PC cards are typically classified into three types different in thickness. Type 1 is 3.3 mm thick, and it is mainly used for memory cards. Type 2 is 5 mm thick, and it is mainly used for I/O features such as modems. Type 3 is 10.5 mm thick, and it is mainly used for hard disks, etc.

As an expansion card suitable for further size reduction, a CF (Compact Flash) card is sometimes used. The CF card is used as a compact card compatible with a flash ATA memory card in a digital camera, portable personal computer, PDA, etc. The size of the CF card is 42.8×36.4×3.3 (mm), which is smaller in each dimension than the PC card. For example, a CF card having a maximum memory capacity of 48 megabytes has been provided by SanDisk Corporation, U.S.A.

Recently, a thicker CF card having a thickness of 5 mm has also been used. The increase in thickness allows the addition of I/O features, thereby providing applicability to modems, LAN cards, SCSI cards, etc.

In the case of connecting a notebook personal computer through a LAN network to the Internet, a wireless LAN module as a PC card is sometimes inserted into a PC card slot provided in the computer to effect wireless connection. In this case, however, an antenna of the wireless LAN module projects from the body of the computer, so that there is a possibility of damage to the antenna or the card itself.

It is considered that the wireless LAN module is preliminarily set as an internal option in the computer. However, it is not easy to change options.

Further, another type of wireless LAN module adapted to USB connection is also commercially available. However, this type of wireless LAN module has a unique connector and therefore lacks versatility.

SUMMARY OF THE INVENTION

It is therefore an object of the present invention to provide an information processing device having a detachable module which can be improved in versatility and can prevent possible damage to any portion of the device.

In accordance with an aspect of the present invention, there is provided an information processing device including a body having a first surface and a second surface, the first surface being provided with a display unit, the second surface being formed with an opening; and an external unit detachably mounted on the second surface of the body so as to cover the opening. The external unit includes a card incorporating an electronic circuit, a case accommodating the card, and a connector for electrically connecting the electronic circuit of the card to an electronic circuit provided in the body.

With this configuration, the external unit having a specific form is adopted, so that the object of the present invention is achieved in accordance with the principle to be hereinafter described.

In accordance with another aspect of the present invention, there is provided an external unit applicable to an information processing device including a body having a first surface and a second surface, the first surface being provided with a display unit, the second surface being formed with an opening. The external unit includes a card incorporating an electronic circuit, a case accommodating the card, and a connector for electrically connecting the electronic circuit of the card to an electronic circuit provided in the body. The external unit is detachably mounted on the second surface of the body so as to cover the opening in use.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 15 is a table showing the correspondence between the interface of a PC card and the interface of a CF card.

DETAILED DESCRIPTION OF THE PREFERRED EMBODIMENTS

Some preferred embodiments of the present invention will now be described in detail with reference to the attached drawings.

Figure 1:
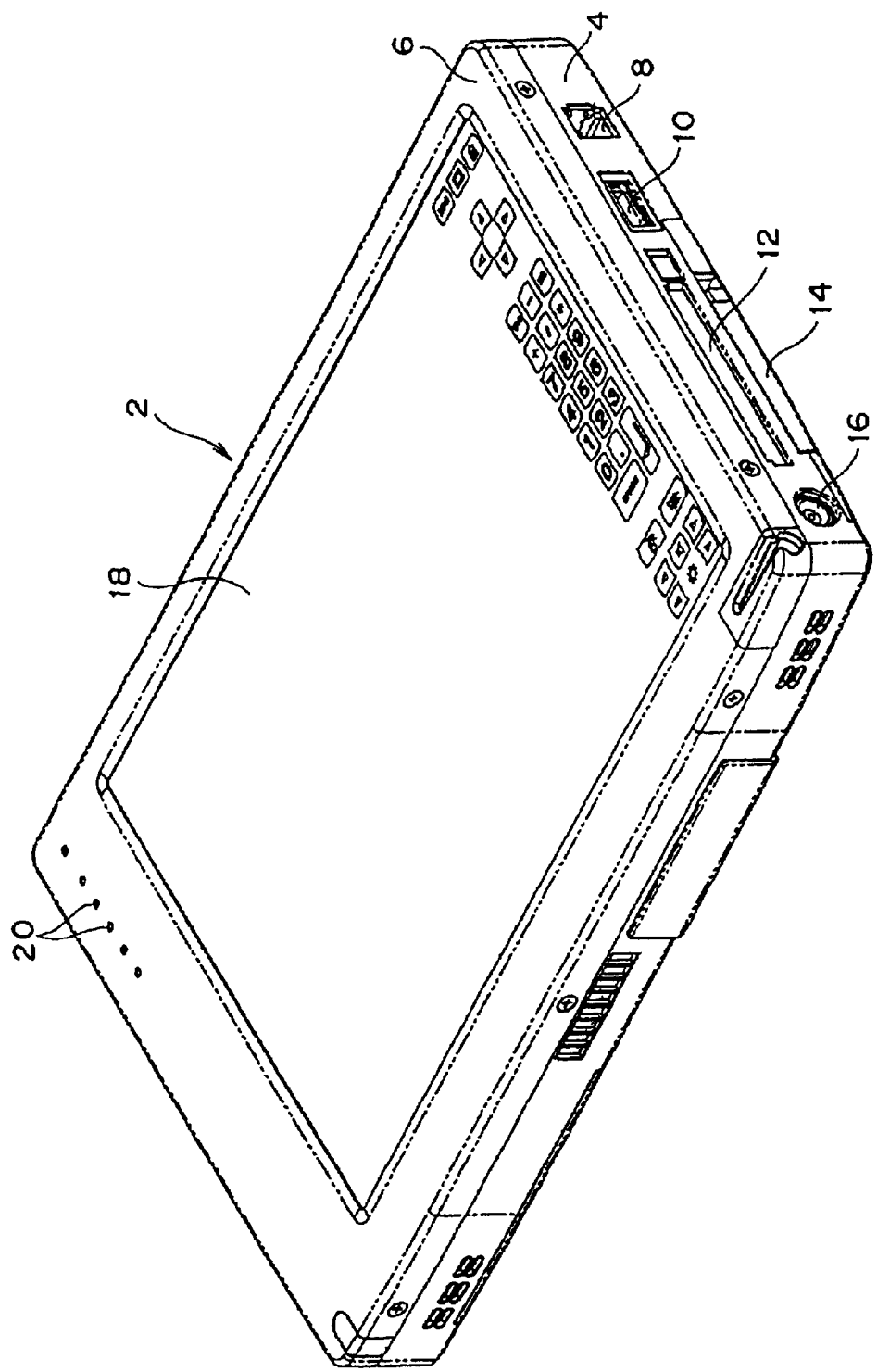
FIG. 1 is a perspective view of an information processing device to which the present invention is applicable, as viewed from the upper side thereof.
Figure 2:
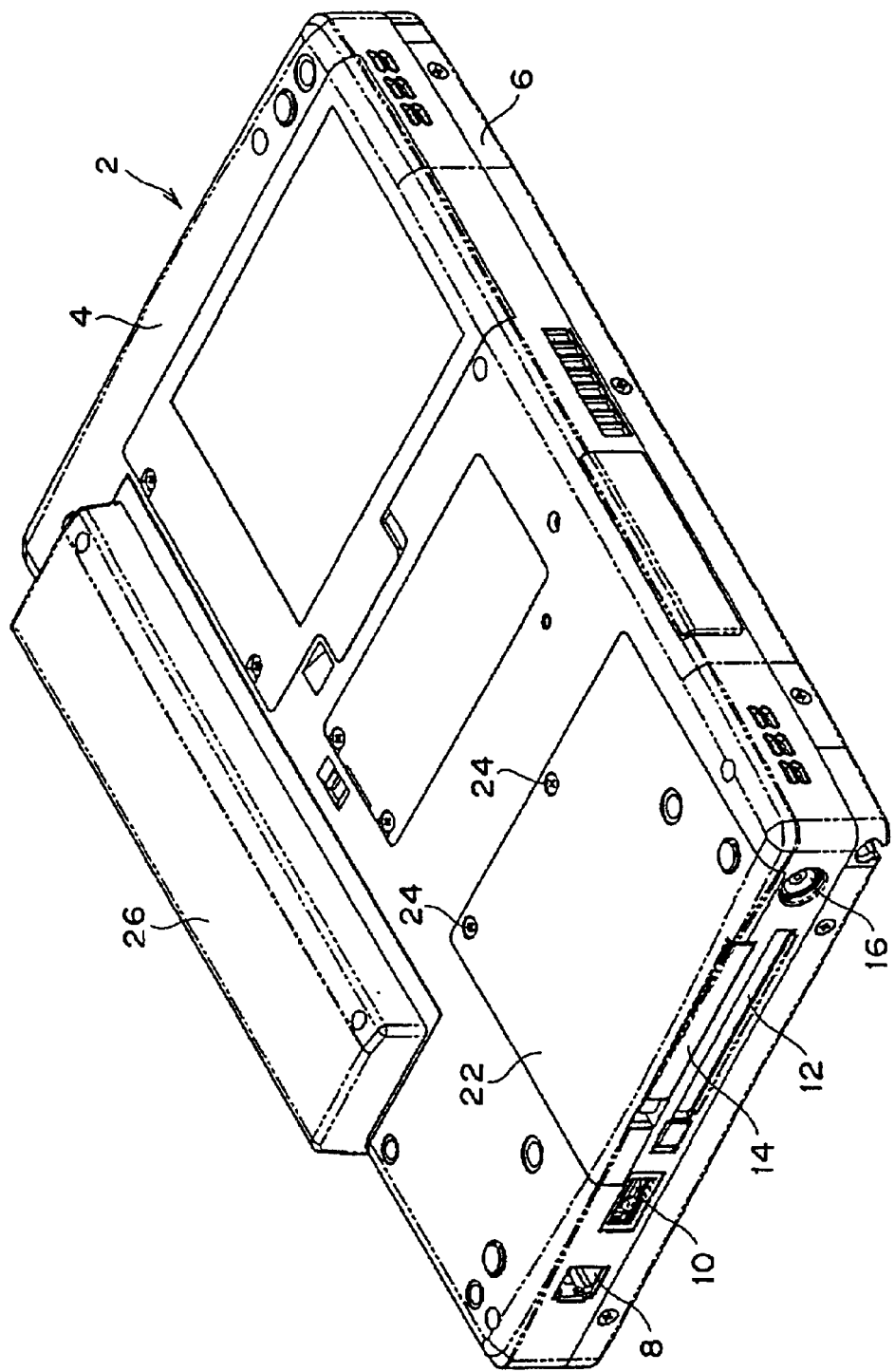
FIG. 2 is a perspective view of the information processing device shown in FIG. 1, as viewed from the lower side thereof.

FIG. 1 is a perspective view of a notebook personal computer as an information processing device to which the present invention is applicable, as viewed from the upper side thereof, and FIG. 2 is a perspective view of the notebook personal computer as viewed from the lower side thereof. This device has a body 2 consisting of a lower housing 4 and an upper housing 6. There are provided on one side surface of the lower housing 4 a modular socket 8 for connection with a telephone line, a USB-ready socket 10 for connection with peripheral equipment, a PC card slot 12 for insertion of a PC card, a CF card slot 14 for insertion of a CF card, and a socket 16 for power supply. The upper housing 6 is provided with a display unit 18 serving also as an input device using a stylus pen or the like, and a plurality of LEDs 20 for indicating various operational states.

As well shown in FIG. 2, a cover 22 for the CF card slot 14 is fixed to the lower housing 4 by screws 24, and a battery pack 26 is detachably mounted on the lower housing 4 at a rear portion thereof as viewed from an operator. The battery pack 26 projects from the lower housing 4 from the viewpoint of capacity or the like.

Figure 3:
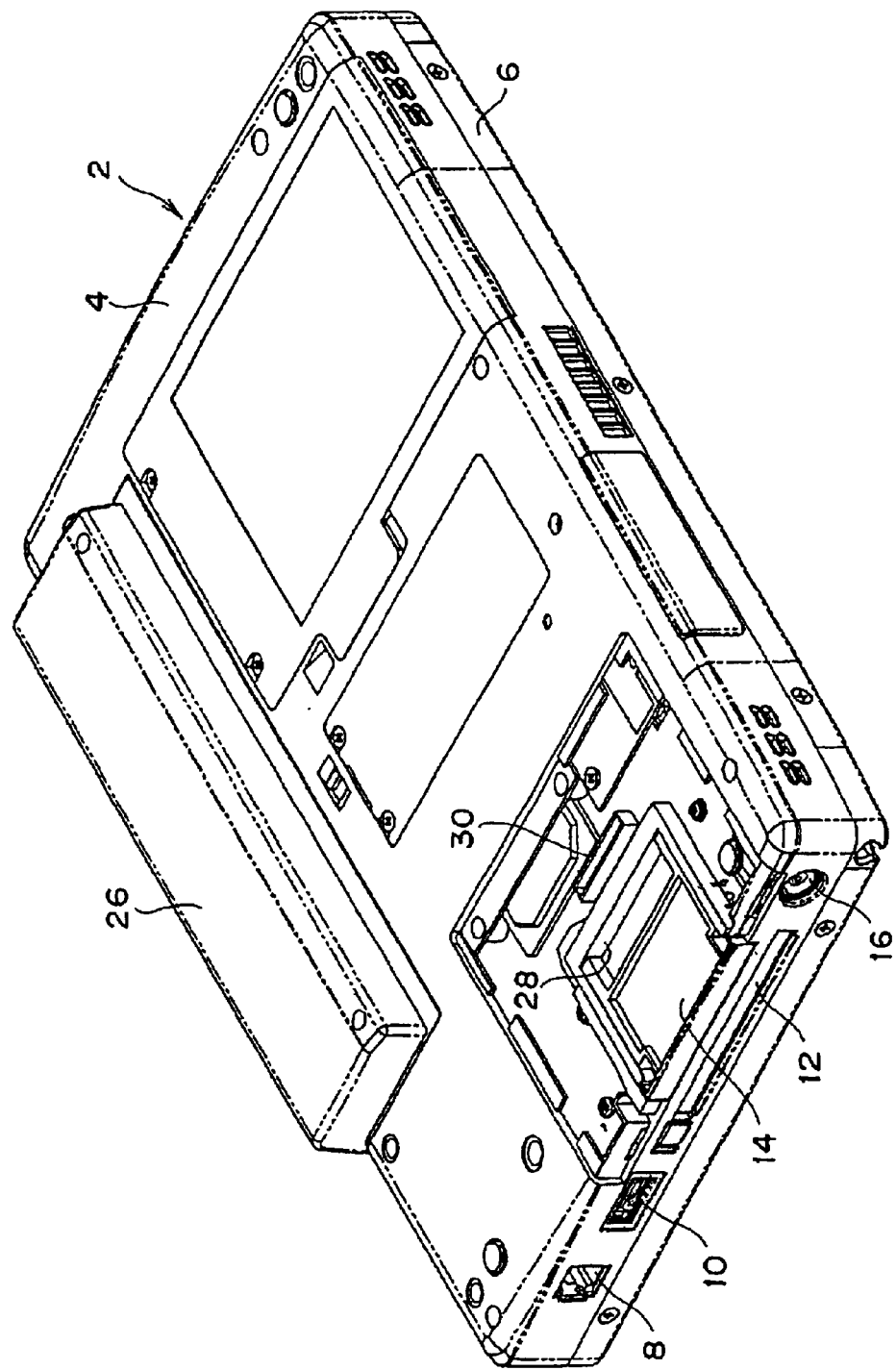
FIG. 3 is a perspective view similar to FIG. 2 in the condition where a cover shown in FIG. 2 has been removed.

Referring to FIG. 3, there is shown a condition where the cover 22 shown in FIG. 2 has been removed. A connector 28 for electrical connection of the CF card and an electrical circuit provided in the body 2 in the case of insertion of the CF card is provided in the CF card slot 14. Further, a connector 30 characteristic of this preferred embodiment is provided behind the connector 28. Either the CF card slot 14 (and the connector 28 associated therewith) or the connector 30 may be selectively provided. Alternatively, both the CF card slot 14 and the connector 30 may be provided.

Figure 4:
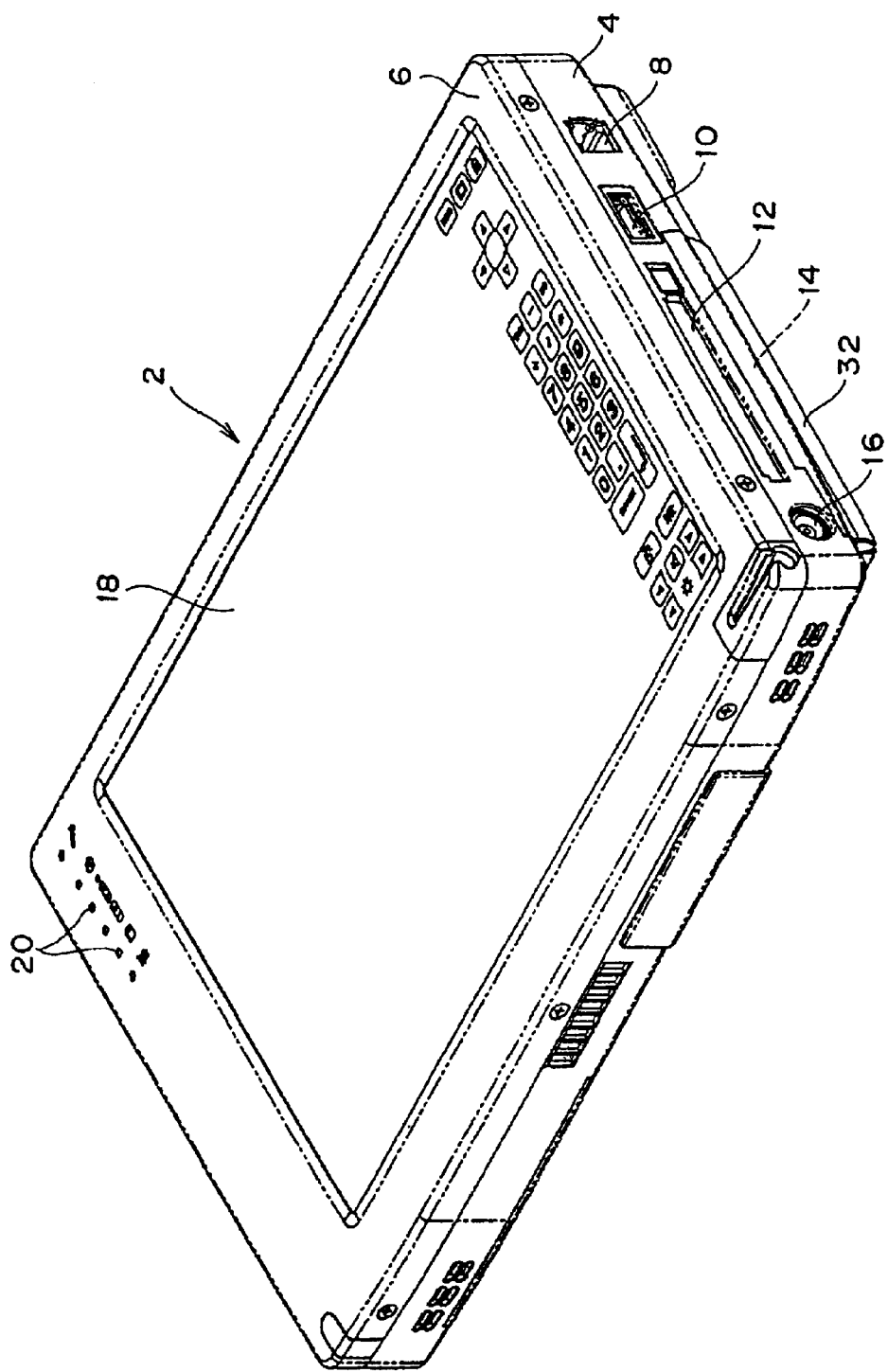
FIG. 4 is a perspective view of an information processing device according to a first preferred embodiment of the present invention as viewed from the upper side thereof.
Figure 5:
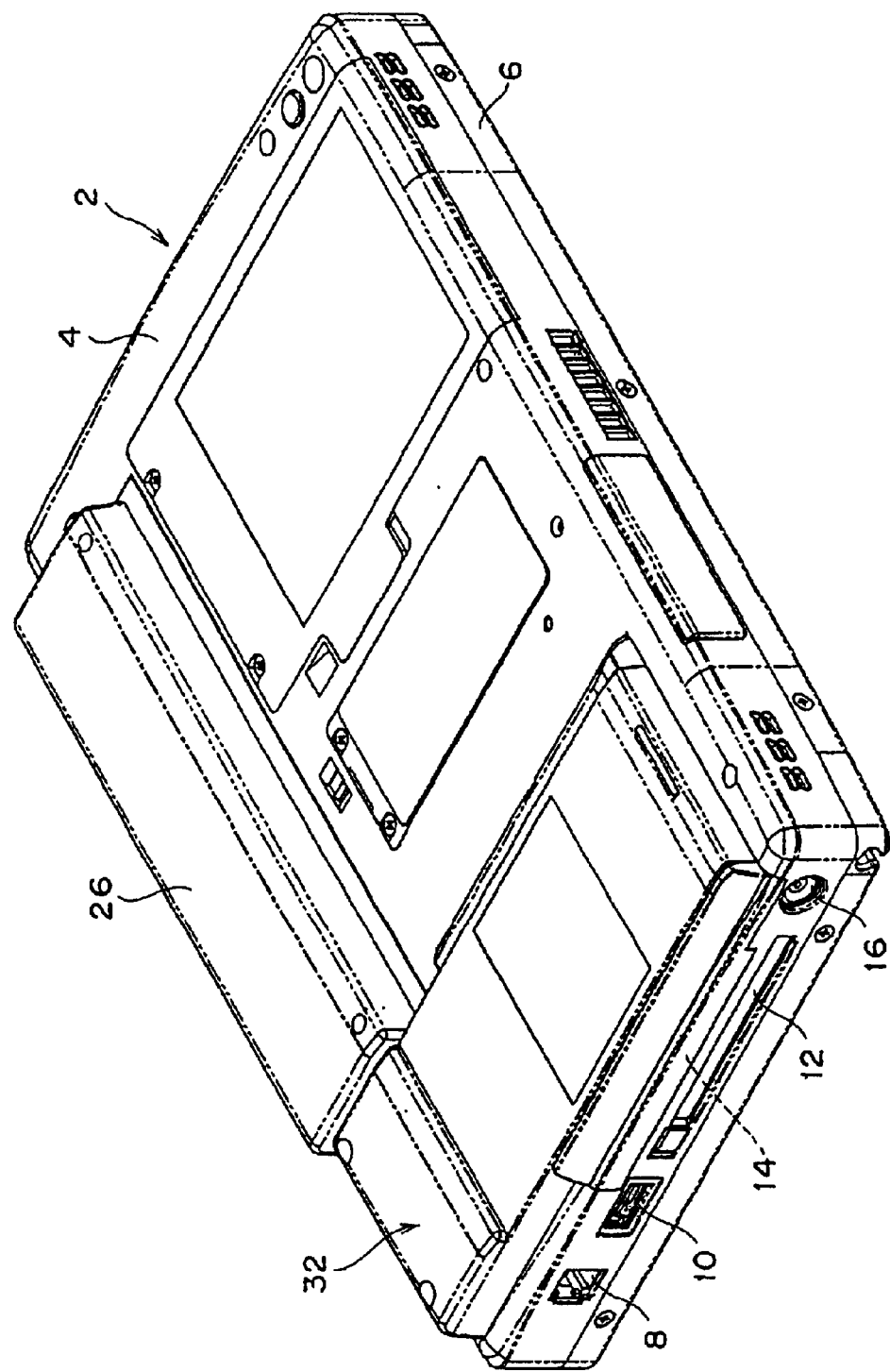
FIG. 5 is a perspective view of the information processing device shown in FIG. 4, as viewed from the lower side thereof.

FIG. 4 is a perspective view of a preferred embodiment of the information processing device according to the present invention as viewed from the upper side thereof, and FIG. 5 is a perspective view of the preferred embodiment as viewed from the lower side thereof. As shown in FIG. 5, an external unit 32 is detachably mounted on the lower housing 4 so as to cover the CF card slot 14 and an opening formed in the vicinity of the CF card slot 14 in the condition where the cover 22 (see FIG. 2) has been removed as shown in FIG. 3.

Figure 6A:
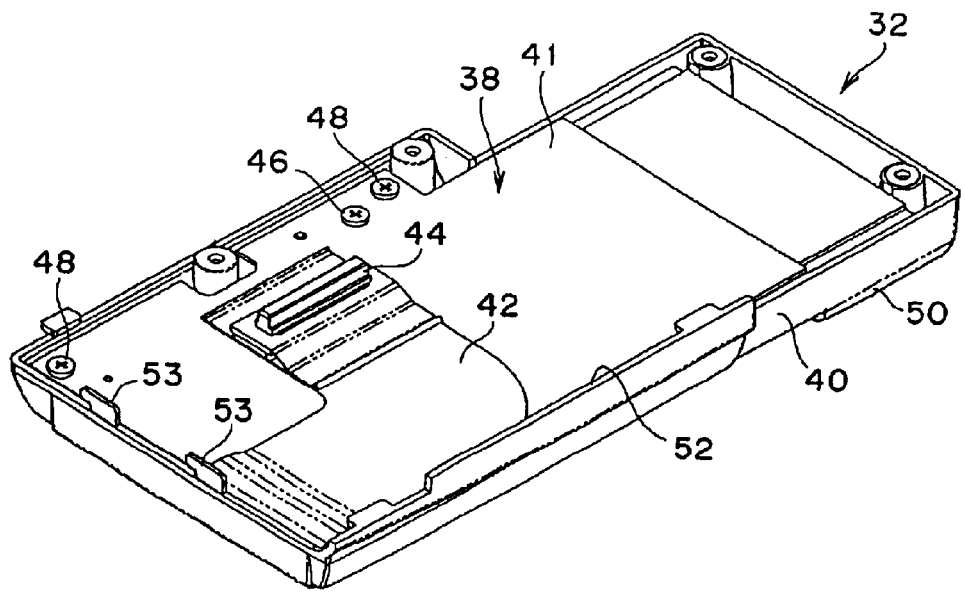
FIGS. 6A and 6B are perspective views of an external unit shown in FIG. 5, as viewed from the upper and lower sides thereof, respectively.
Figure 6B:
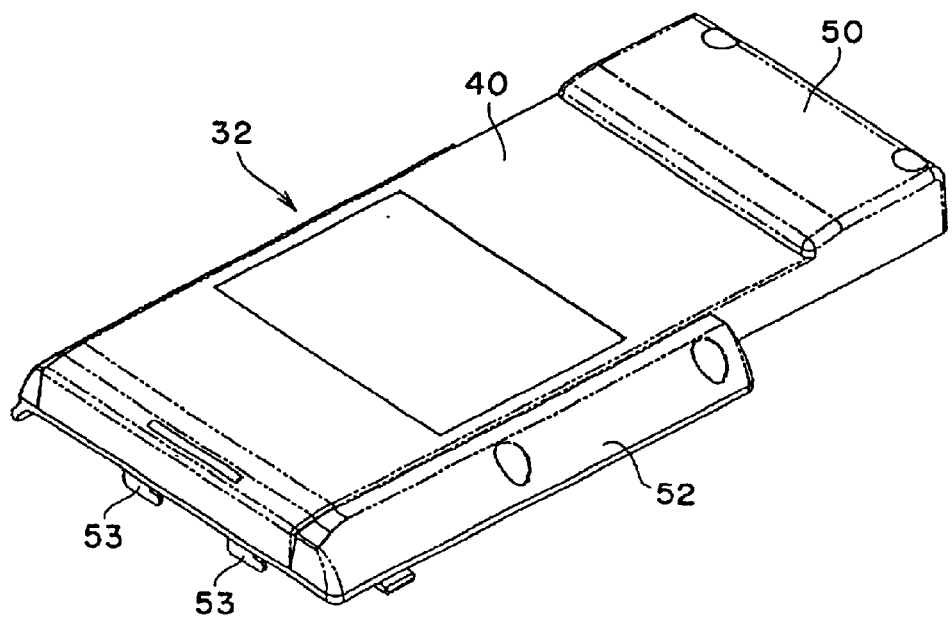
Figure 7A:
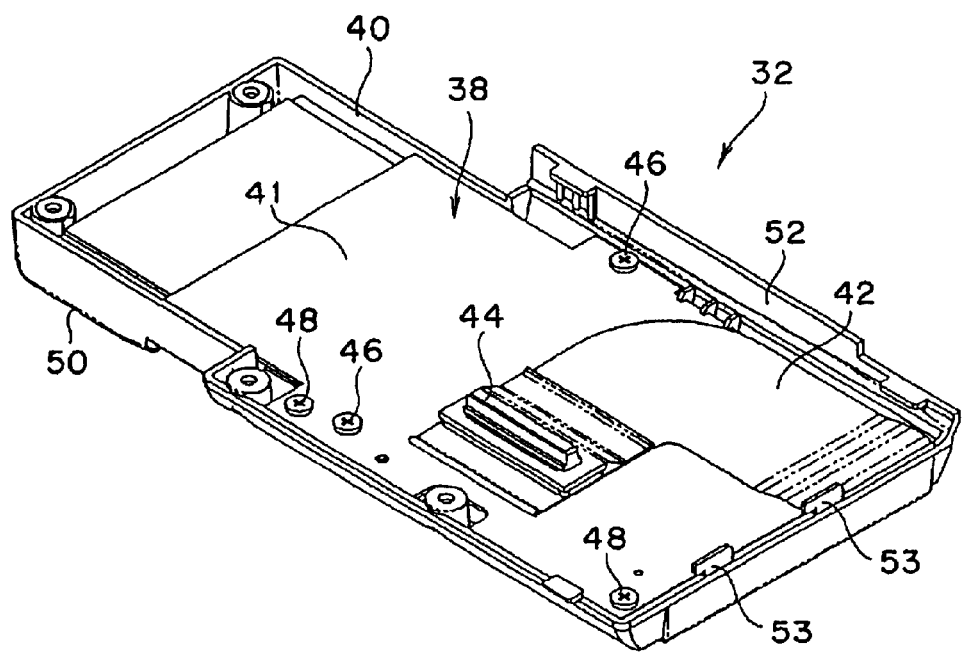
FIGS. 7A and 7B are perspective views similar to FIGS. 6A and 6B, respectively, as viewed at different angles.
Figure 7B:
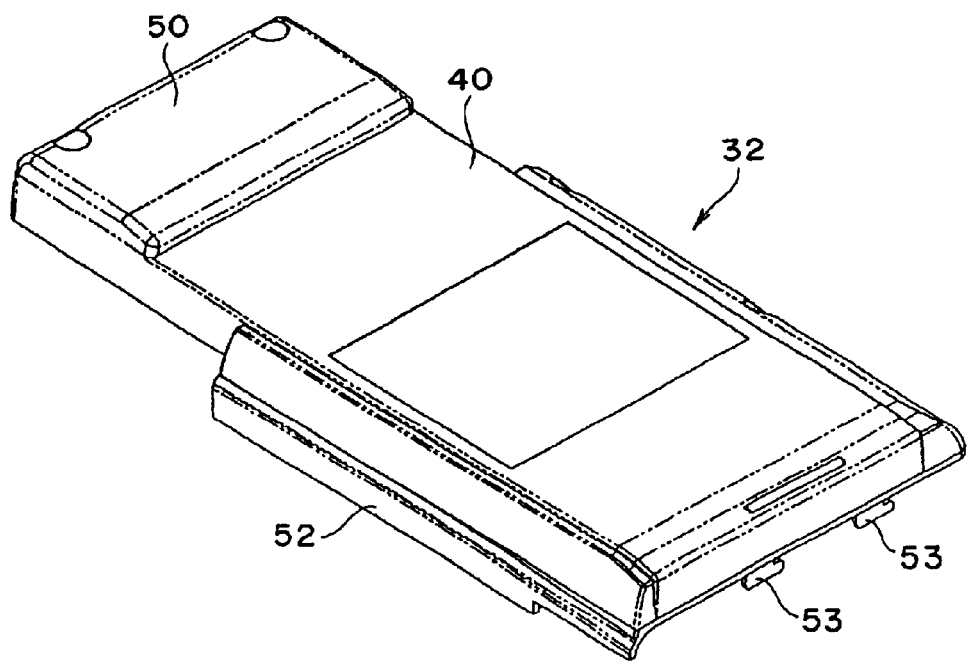

FIGS. 6A and 7A are perspective views of the external unit 32 as viewed from the upper side thereof at different angles, and FIGS. 6B and 7B are perspective views of the external unit 32 as viewed from the lower side thereof at different angles. FIGS. 8 to 11 are exploded perspective views of the external unit 32.

Figure 8:
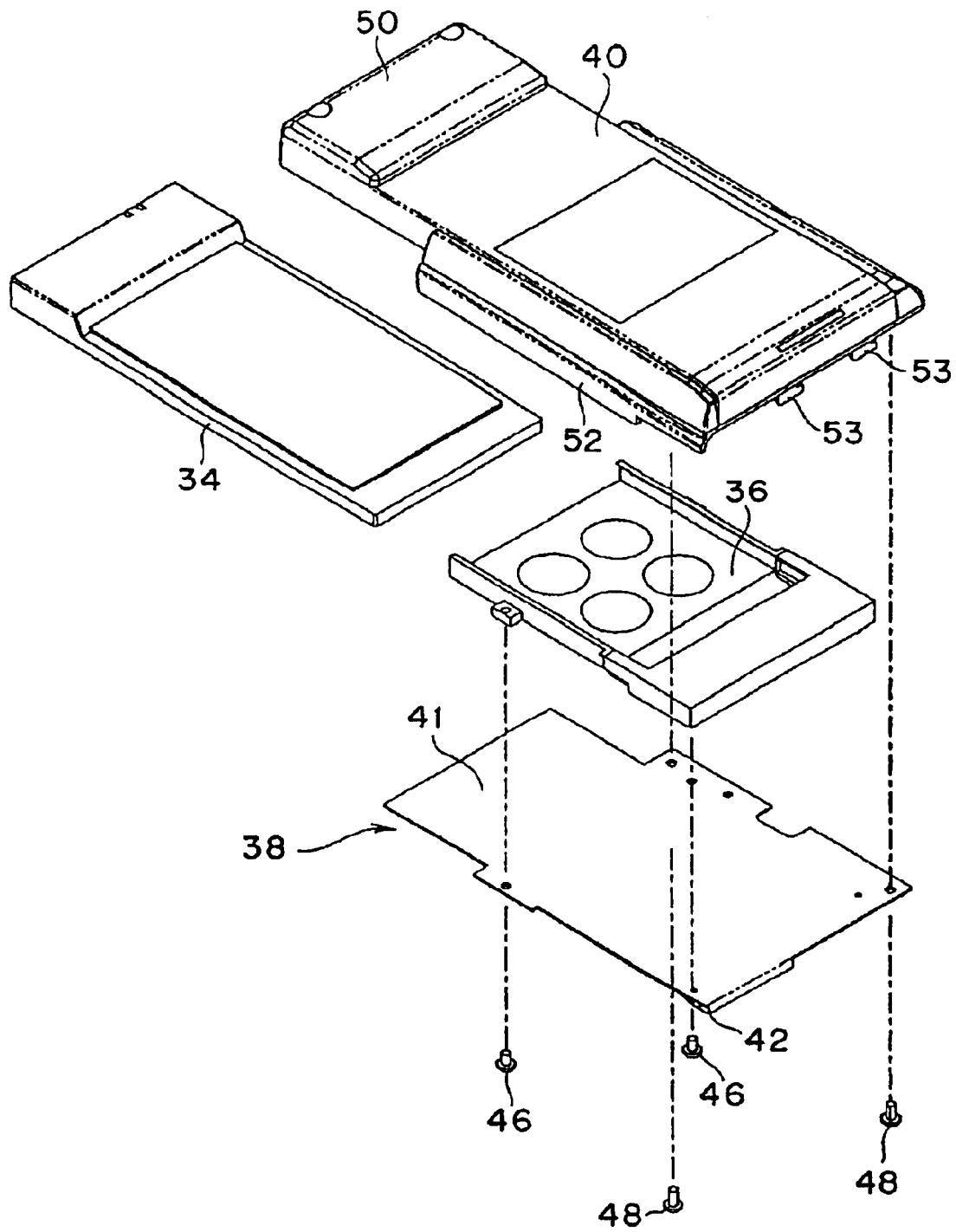
FIGS. 8 and 9 are exploded perspective views of the external unit as viewed from opposite sides.
Figure 9:
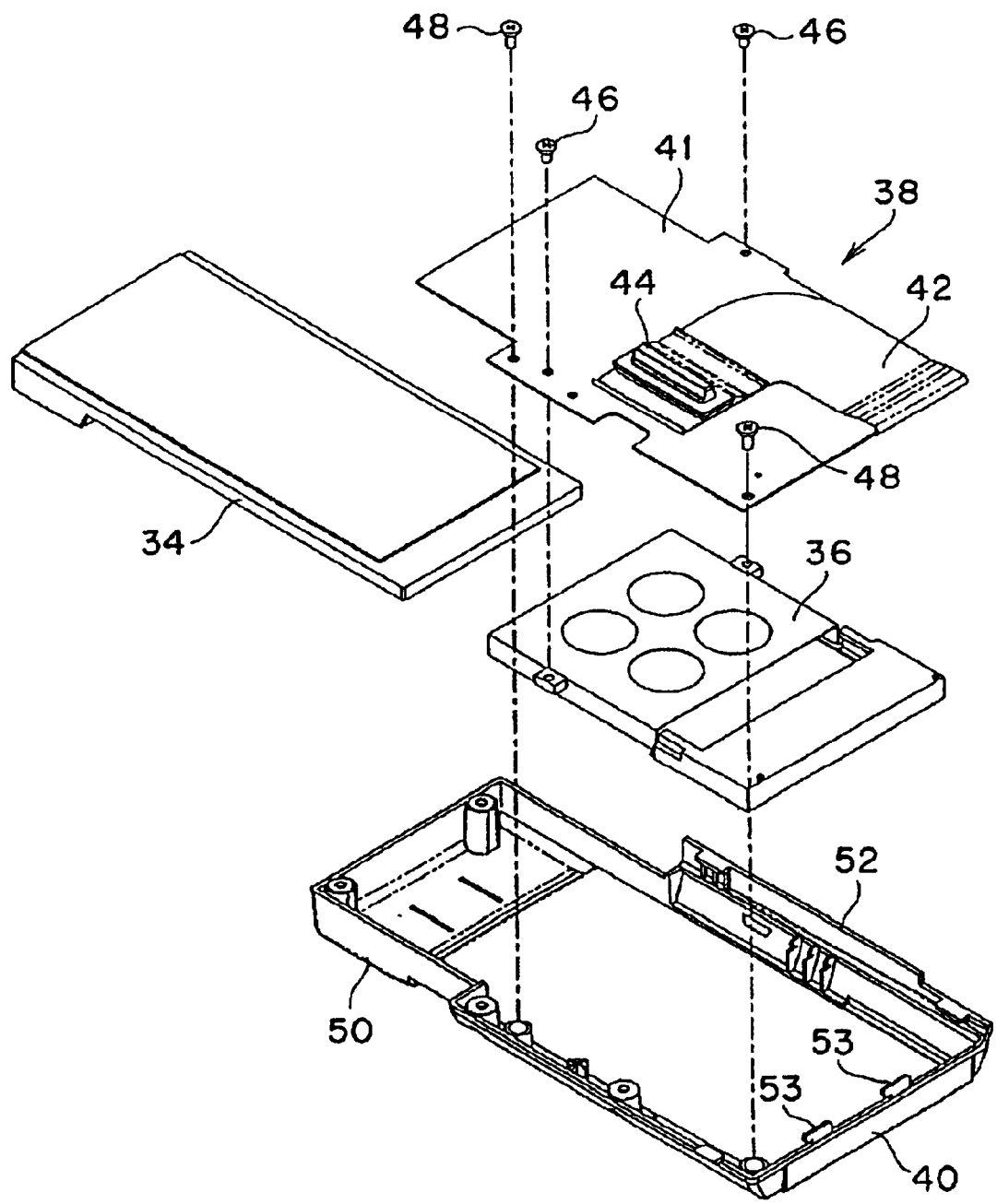
Figure 10:
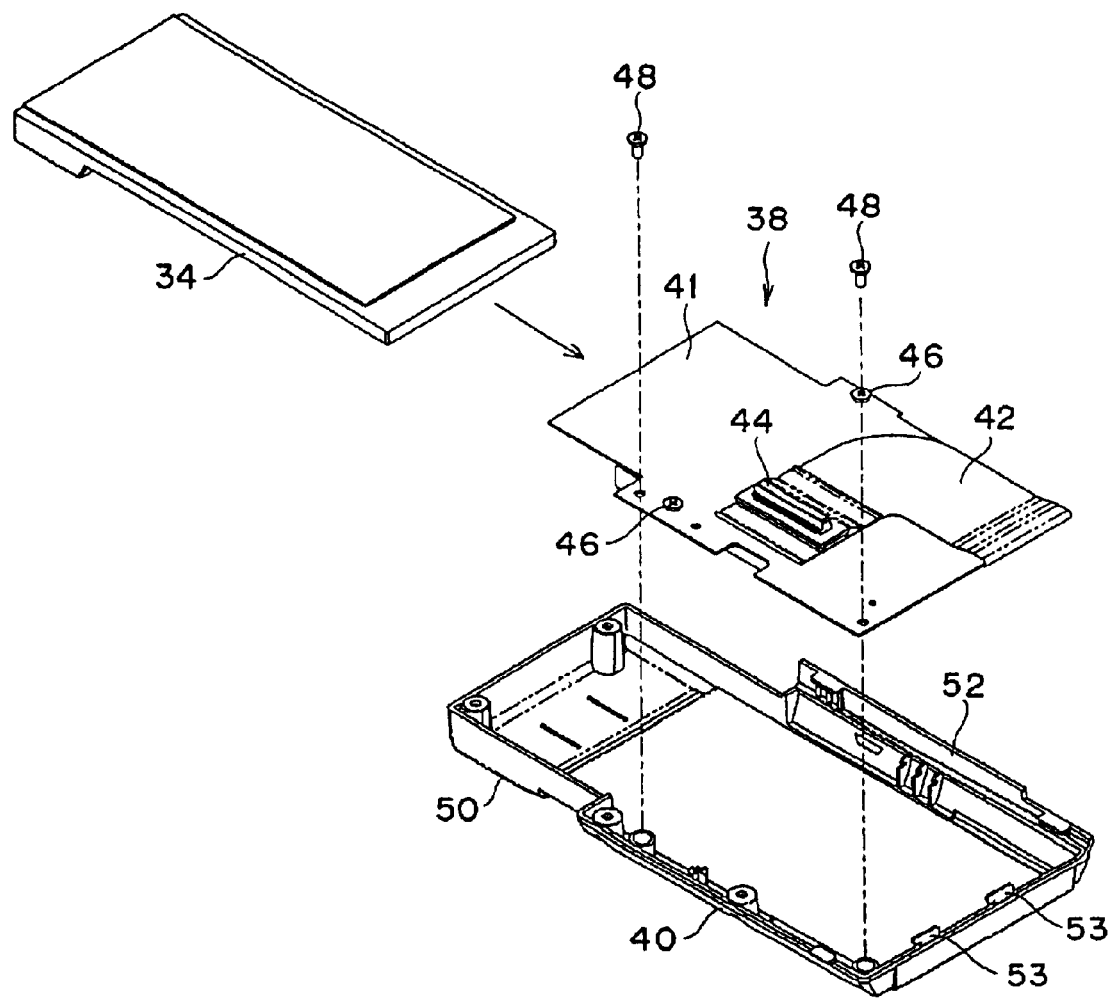
FIGS. 10 and 11 are exploded perspective views similar to FIGS. 8 and 9, showing a condition where a connector substrate is mounted on a shield case.
Figure 11:
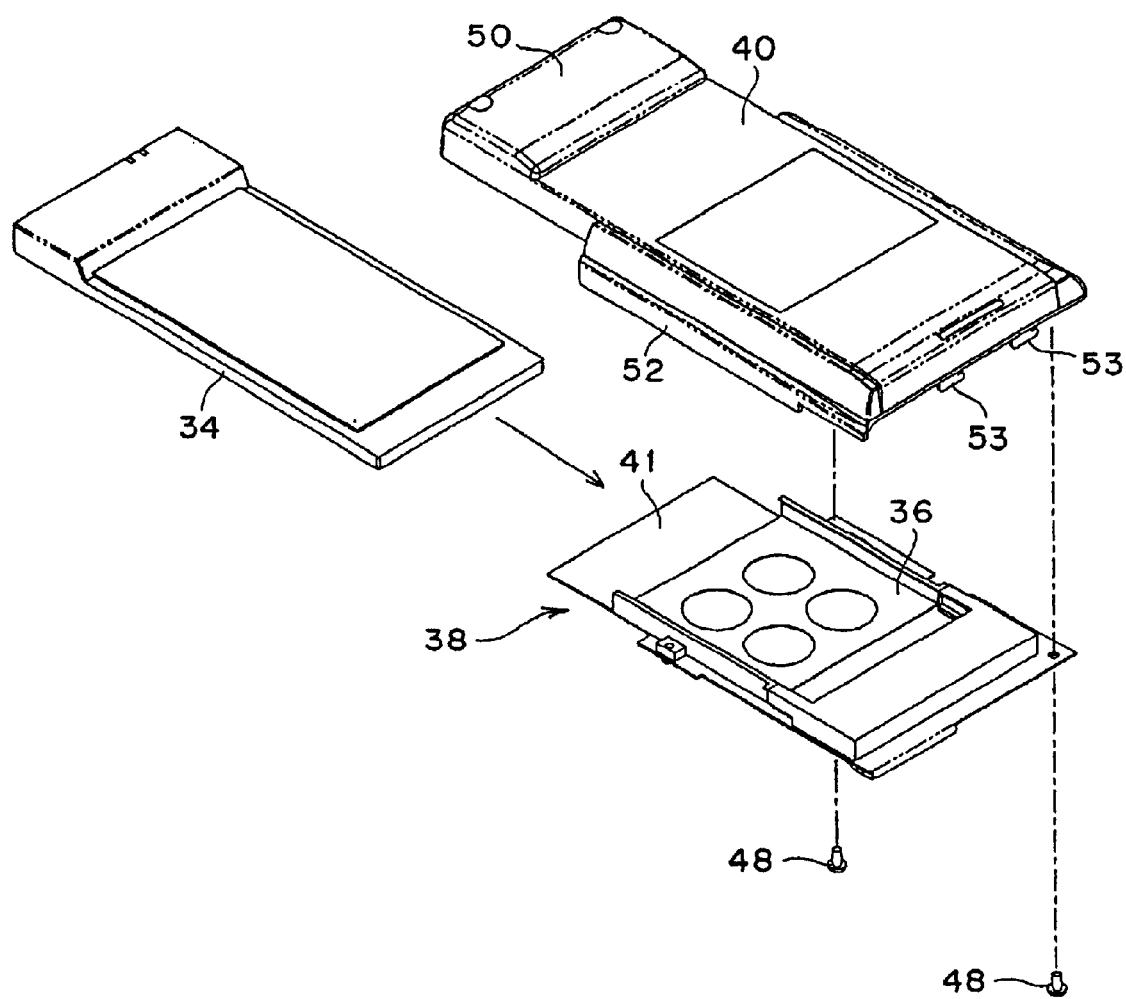

As well shown in FIGS. 8 and 9, the external unit 32 includes a PC card 34, a shield case 36, a connector substrate 38, and a cover 40. The PC card 34 is accommodated in the cover 40 with the shield case 36 and the connector substrate 38. The cover 40 is formed of resin or the like. The connector substrate 38 includes a printed wiring board 41 for electrical wiring, a flexible printed wiring board 42 connected at its base end to an end portion of the printed wiring board 41, and a connector 44 provided in the vicinity of the front end of the flexible printed wiring board 42. The connector substrate 38 is mounted on the shield case 36 by screws 46. The PC card 34 is held in the shield case 36, and accommodated in the cover 40. Thus, in the condition where the PC card 34, the shield case 36, and the connector substrate 38 are assembled, the connector substrate 38 is mounted on the case 40 by screws 48.

The PC card 34 is a wireless LAN module, for example. In this case, the PC card 34 has a thick-walled antenna portion, and the case 40 correspondingly has a projecting portion (recessed portion as viewed from the inside of the cover 40) 50 for receiving the thick-walled antenna portion of the PC card 34. The case 40 further has a side plate 52 projecting on one side, so as to cover the CF card slot 14 when the external unit 32 is mounted on the lower housing 4 as shown in FIG. 5, for example. Further, the case 40 has two hooks 53 projecting on another side opposite to the projecting portion 50, so as to engage corresponding openings formed on the lower housing 4, thereby facilitating attachment/detachment of the external unit 32 to/from the lower housing 4.

Figures 12A, 12B:
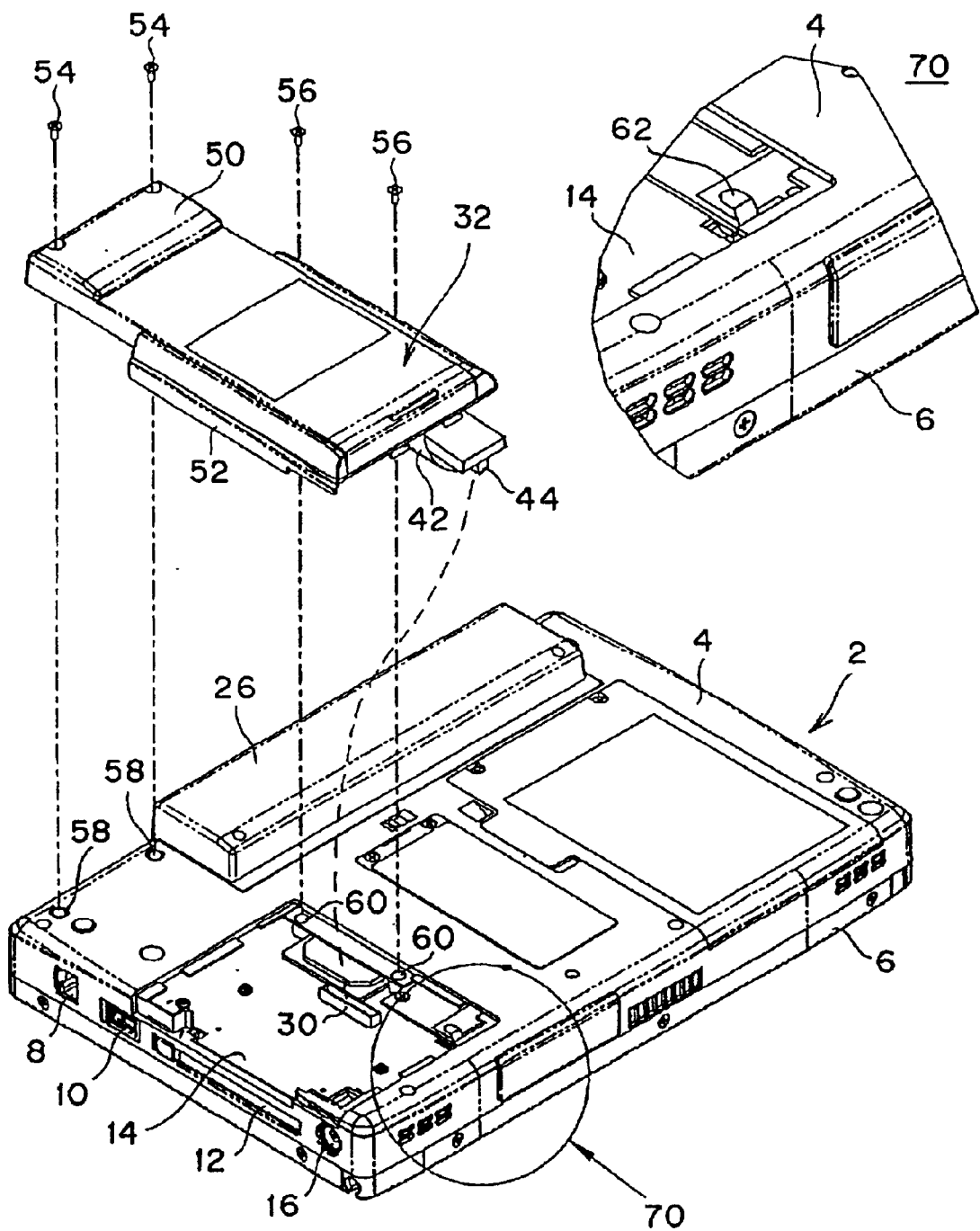
FIG. 12A is an exploded perspective view of the information processing device according to the first preferred embodiment.
FIG. 12B is an enlarged view of an encircled portion shown in FIG. 12A.

FIG. 12A is an exploded perspective view for illustrating a method of mounting the external unit 32 to the lower housing 4, and FIG. 12B is an enlarged view of an encircled portion 70 shown in FIG. 12A.

In this preferred embodiment, a card receiving portion in the CF card slot 14 as shown in FIG. 3 is eliminated, and the connector 30 is provided on a main printed wiring board provided in the body 2. The connector 44 of the external unit 32 is connected to the connector 30, and the external unit 32 is mounted on the lower housing 4 by screws 54 and 56. The screws 54 are engaged into tapped holes 58 formed on the lower housing 4 to secure the projecting portion 50 of the case 40 at its opposite end portions to the lower housing 4. The tapped holes 58 are formed along an extension of the battery pack 26. The screws 56 are engaged into tapped holes 60 formed on the lower housing 4 to secure a side portion of the case 40 opposite to the side plate 52 of the case 40 to the lower housing 4.

In this mounted condition of the external unit 32, the projecting portion 50 of the case 40 is at substantially the same level as that of the battery pack 26 as shown in FIG. 5. Furthermore, the battery pack 26 and the projecting portion 50 of the case 40 are located at the rear portion of the lower housing 4 as viewed from the operator, so that when the lower housing 4 of the body 2 is placed on a horizontal surface, the display unit 18 (see FIG. 4, for example) is slightly tilted up toward the operator, thereby facilitating viewing of a displayed image on the display unit 18 and inputting of data to the display unit 18.

As shown in FIG. 12B, an elastically deformable leaf spring contact 62 projects from the inside of the lower housing 4. The leaf spring contact 62 is at a ground potential in the body 2. When the external unit 32 is mounted on the lower housing 4, the leaf spring contact 62 comes into elastic contact with a ground pattern or shield pattern of the external unit 32, thereby enhancing grounding in the external unit 32.

Particularly, in the case that the external unit 32 is a wireless LAN module as in this preferred embodiment, the stabilization of ground potential is important in improving the antenna performance, so that this preferred embodiment is greatly effective in allowing high-performance wireless connection to a network.

In this preferred embodiment, the external unit 32 is so configured as to adapt to the existing PC card 34, so that various functions can be provided by using the existing PC card 34. Further, in the case that the PC card 34 is a wireless LAN module, the antenna portion of the PC card 34 is accommodated in the case 40, thereby preventing possible damage to the PC card 34 as in the related art wherein the antenna portion of the PC card 34 projects from the body of an information processing device.

Further, since the external unit 32 can be easily attached and detached, desired options can be easily selected. Thus, it is possible to provide a versatile information processing device according to this preferred embodiment.

In this preferred embodiment, the external unit 32 is used in place of the CF card to be applied to the CF card slot 14. Accordingly, the function can be expanded by the external unit 32 having the PC card 34. In addition, by inserting another PC card (not shown) into the PC card slot 12, the function can be further expanded.

For example, while this information processing device is being connected through a wireless LAN to a network by using the external unit 32, data can be down-loaded from the network to a flash memory card or HDD card inserted into the PC card slot 12.

As another example, while this information processing device is being connected through a wireless LAN to a network by using the external unit 32, data can be up-loaded from a CD-ROM/DVD-ROM inserted into the PC card slot 12 to the network.

As another example, while this information processing device is being connected through a wireless LAN to a network by using the external unit 32, data can be up-loaded from a digital video camera or the like through an IEEE1394 card inserted into the PC card slot 12, to the network.

As another example, while this information processing device is being connected through a wireless LAN to a network by using the external unit 32, a security card (e.g., Smart Card) can be used.

The present invention is not limited to the case that the external unit 32 is a wireless LAN module. For example, the external unit in the present invention may be configured by using various other PC cards such as a flash memory card, Bluetooth card, PHS card, and MPEG decoder card to provide various functions of these cards as options. Thus, it is possible to provide a versatile information processing device.

Further, since the case 40 accommodating the PC card 34 is mounted on the lower housing 4, physical access from a third party to the PC card 34 is difficult, thereby effecting antitheft means to the PC card 34. Further, by using special screws such that loosening after once tightening them can be determined in mounting the external unit 32 on the lower housing 4, it can be easily checked whether or not physical access from a third party to the PC card 34 has been made. For example, in the case of using a flash memory card as the PC card 34, the leakage of private information such as customer information as data can be prevented.

Figure 13:
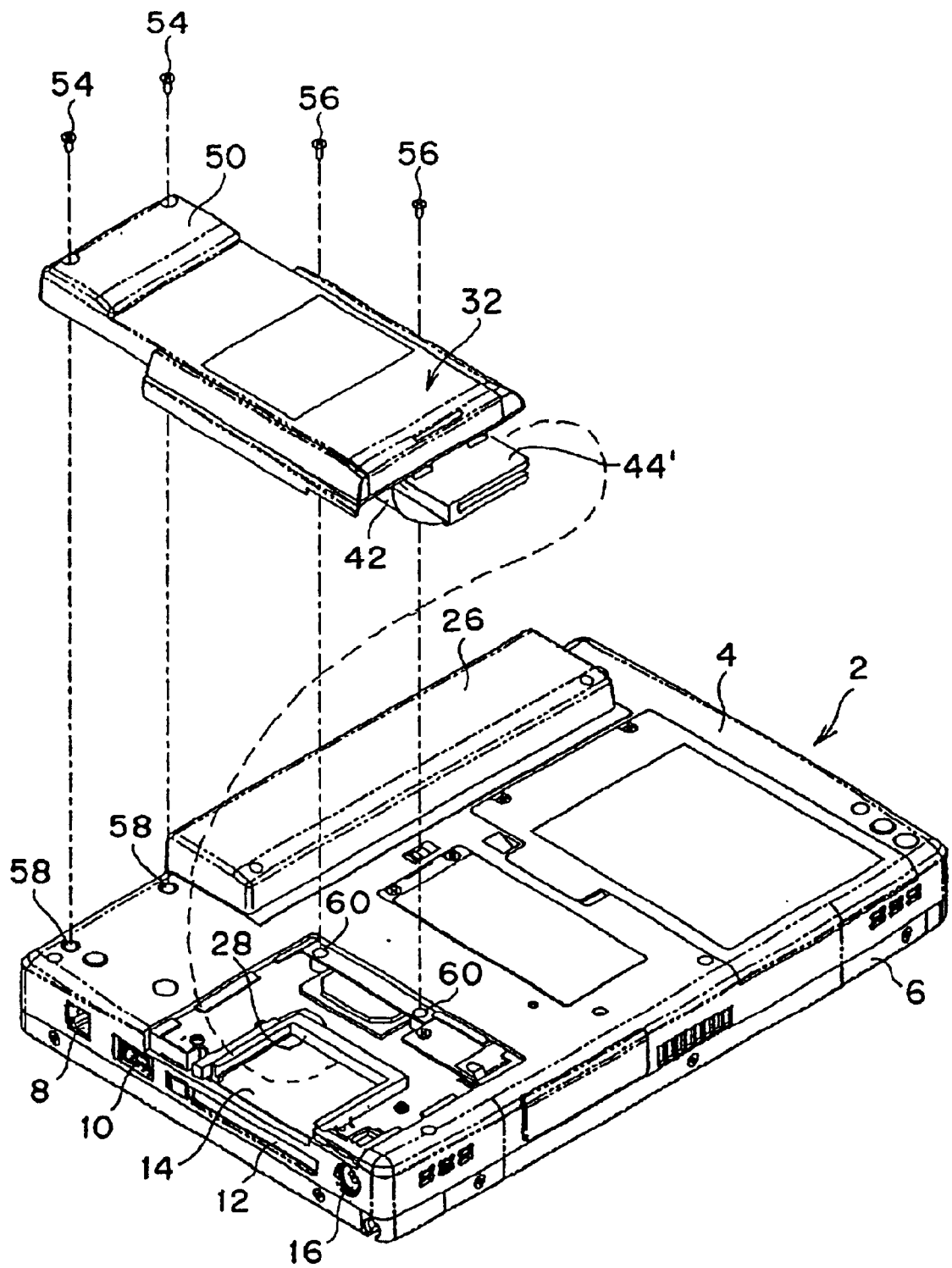
FIG. 13 is an exploded perspective view of an information processing device according to a second preferred embodiment of the present invention.

Referring to FIG. 13, there is shown another preferred embodiment of the information processing device according to the present invention. In this preferred embodiment, a connector 44' adapted to the connector 28 in the CF card slot 14 is mounted on the front end portion of the flexible printed wiring board 42 instead of the connector 44 shown in FIG. 12A. With this configuration, the PC card 34 built in the external unit 32 can be adapted to the CF card slot 14 without changing the internal structure of the body 2.

FIG. 15 is a table showing the correspondence between the interface of the PC card and the interface of the CF card, for reference purposes. As apparent from FIG. 15, the number of connector pins in the PC card is 68, whereas the number of connector pins in the CF card is 50. However, all of the connector pins in the PC card are not used, so that the PC card 34 can be adapted to the CF card slot 14 with no effect on the scale of the electrical circuit provided in the body 2.

Figure 14:
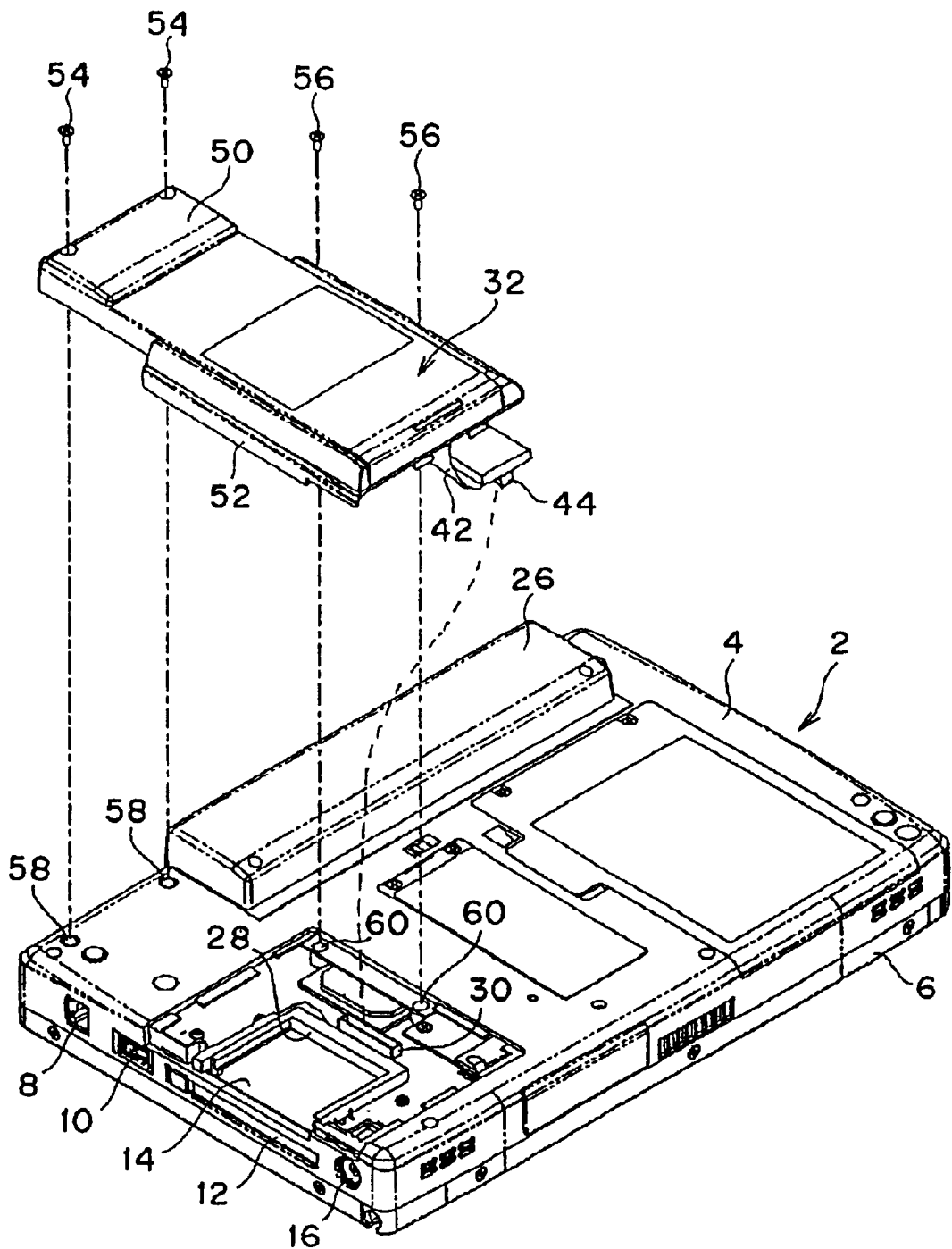
FIG. 14 is an exploded perspective view of an information processing device according to a third preferred embodiment of the present invention.

Referring to FIG. 14, there is shown a further preferred embodiment of the information processing device according to the present invention. In this preferred embodiment, the CF card slot 14 is left and the connector 30 for deriving a signal from the PC card which signal is in exclusive relationship with a signal in the CF card is provided just behind the CF card slot 14. Further, the connector 44 of the external unit 32 is connected to the connector 30.

Also according to this preferred embodiment, the PC card 34 can be adapted to the CF card slot 14 with no effect on the scale of the electrical circuit in the body 2.

Particularly in the case that the CF card and the PC card are in exclusive relationship, it is necessary to prevent erroneous insertion of the CF card into the CF card slot 14. In this preferred embodiment, however, the case 40 of the external unit 32 has the side plate 52 projecting to cover the CF card slot 14, so that when the external unit 32 is mounted on the lower housing 4, erroneous insertion of the CF card into the CF card slot 14 can be prevented.

According to the present invention as described above, it is possible to provide an information processing device which can be improved in versatility and can prevent possible damage to any portion of the device.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An information processing device comprising:
 a body having a first surface and a second surface, said first surface being provided with a display unit, said second surface being formed with an opening; and
 an external unit detachably mounted on said second surface of said body so as to cover said opening, wherein
 said external unit includes a card incorporating an electronic circuit, a case accommodating said card, and a connector for electrically connecting said electronic circuit of said card to an electronic circuit provided in said body, and
 said body has a slot formed inside said opening to receive another card different from said card of said external unit, an said case of said external unit has a side plate projecting on one side of the case, to cover said slot when said external unit is mount on said body.

2. An information processing device according to claim 1, wherein said card comprises a wireless device for connecting said information processing device to a network.

3. An information processing device according to claim 2, wherein said case is formed of resin so as to allow transmission and reception of electromagnetic waves between an antenna of said wireless device and outside equipment.

4. An information processing device according to claim 1, further comprising a battery pack provided so as to project from said second surface of said body, said battery pack having substantially the same height as that of a thickest portion of said external unit.

5. An information processing device according to claim 4, wherein said battery pack is located at a rear of portion of said body as viewed from an operator.

6. An information processing device according to claim 1, wherein said connector of said external unit is adapted to a connector provided in said slot.

7. An information processing device according to claim 1, wherein said body has a slot for receiving another card different from said card of said external unit.

8. An external unit applicable to an information processing device including a body having a first surface and a second surface, said first surface being provided with a display unit, said second surface being formed with an opening, said external unit comprising:
- a card incorporating an electronic circuit;
- a case accommodating said card; and
- a connector for electrically connecting said electronic circuit of said card to an electronic circuit provided in said body wherein said external unit is detachably mounted on said second surface of said body so as to cover said opening in use, and said body has a slot formed inside said opening to receive another card different from said card of said external unit, and said case of said external unit has a side plate projecting on one side of the case, to cover said slot when said external unit is mount on said body.

\* \* \* \* \*

UNITED STATES PATENT AND TRADEMARK OFFICE
CERTIFICATE OF CORRECTION

PATENT NO.     : 6,839,229 B2
DATED          : January 4, 2005
INVENTOR(S)    : Kyozuko et al.

It is certified that error appears in the above-identified patent and that said Letters Patent is hereby corrected as shown below:

<u>Column 6,</u>
Line 57, change "an" to -- and --;

<u>Column 7,</u>
Line 7, delete "of" first occurrence.

Signed and Sealed this

Seventeenth Day of May, 2005

JON W. DUDAS
*Director of the United States Patent and Trademark Office*